(12) United States Patent  
Kriegel et al.

(10) Patent No.: US 10,871,130 B2  
(45) Date of Patent: Dec. 22, 2020

(54) ARRANGEMENT AND PROCESS FOR CARRYING OUT AN INTENSIFIED COMBUSTION

(71) Applicant: Fraunhofer-Gesellschaft zur Foerderung der angewandten Forschung e. V., Munich (DE)

(72) Inventors: Ralf Kriegel, Kahla (DE); Robert Kircheisen, Jena (DE); Markku Lampinen, Turku (FI); Ville Ristimaeki, Turku (FI)

(73) Assignee: FRAUNHOFER-GESELLSCHAFT ZUR FOERDERUNG DER ANGEWANDTEN FORSCHUNG E. V., Munich (DE)

( * ) Notice: Subject to any disclaimer, the term of this patent is extended or adjusted under 35 U.S.C. 154(b) by 933 days.

(21) Appl. No.: 15/107,153

(22) PCT Filed: Dec. 23, 2014

(86) PCT No.: PCT/DE2014/100463  
§ 371 (c)(1),  
(2) Date: Jun. 22, 2016

(87) PCT Pub. No.: WO2015/096833  
PCT Pub. Date: Jul. 2, 2015

(65) Prior Publication Data  
US 2017/0030304 A1 Feb. 2, 2017

(30) Foreign Application Priority Data  
Dec. 23, 2013 (DE) .................. 10 2013 114 852

(51) Int. Cl.  
*F02M 25/12* (2006.01)  
*F23C 99/00* (2006.01)  
(Continued)

(52) U.S. Cl.  
CPC ............ *F02M 25/12* (2013.01); *F02B 47/06* (2013.01); *F02D 21/02* (2013.01); *F23C 99/00* (2013.01);  
(Continued)

(58) Field of Classification Search  
CPC ......... F02M 35/1036; F02M 35/10052; F02M 35/10222; F02M 35/10229; F02M 26/17;  
(Continued)

(56) References Cited

U.S. PATENT DOCUMENTS 5,447,024 A * 9/1995 Ishida .................... F01K 3/188  
60/39.461  
6,059,858 A 5/2000 Lin et al.  
(Continued)

FOREIGN PATENT DOCUMENTS

CN 1695002 A 11/2005  
CN 1695798 A 11/2005  
(Continued)

OTHER PUBLICATIONS

E. Girdauskaite et al., "Correlation between thermodynamic and thermomechanical quantities of selected perovskite-type oxides", Dec. 25, 2008, Journal of Alloys and Compounds, 477 (2009) 468-472.*

(Continued)

*Primary Examiner* — Scott J Walthour  
(74) *Attorney, Agent, or Firm* — Abel Schillinger, LLP

(57) ABSTRACT

The invention relates to a combustion engine and to a process for producing energy by means of expansion work in combustion engines. The invention is based on the problem of providing a possibility for supplying oxygen to the combustion space of a self-compacting combustion engine in an energy-efficient manner. According to the invention, with an arrangement for carrying out an intensi- (Continued)

fied combustion for automatically increasing pressure of the combustion gases and using them in a combustion engine for performing mechanical work, the above-stated problem is solved in that an oxygen storage material is present in the combustion space so that a self-compressing combustion process is made possible by storing the oxygen in the oxygen storage material in the combustion space.

20 Claims, 1 Drawing Sheet

(51) Int. Cl.
  *F23R 7/00* (2006.01)
  *F02B 47/06* (2006.01)
  *F02D 21/02* (2006.01)
(52) U.S. Cl.
  CPC ...... *F23R 7/00* (2013.01); *F23C 2900/99008* (2013.01); *Y02E 20/34* (2013.01); *Y02T 10/12* (2013.01)
(58) Field of Classification Search
  CPC ... F02M 25/12; F02C 3/20; F02C 3/26; F02C 3/30; F02C 3/305; F23R 3/40; F23C 13/08; F23C 2900/13001; F23C 2900/99008; F23C 10/01; Y02E 20/346; C10J 3/725; C10J 2300/18; C10J 2300/1807; B01J 18/388
  See application file for complete search history.

(56) References Cited

U.S. PATENT DOCUMENTS

| | | | |
|---|---|---|---|
| 6,464,955 B2 | 10/2002 | Zeng et al. | |
| 7,430,869 B2 | 10/2008 | Su et al. | |
| 7,767,191 B2* | 8/2010 | Thomas | C01B 3/063 423/648.1 |
| 8,555,652 B1 | 10/2013 | Touchton | |
| 8,617,269 B2 | 12/2013 | Son et al. | |
| 9,573,823 B2* | 2/2017 | LaMont | C01G 3/02 |
| 9,777,920 B2* | 10/2017 | Fan | F23C 99/00 |
| 10,144,640 B2* | 12/2018 | Fan | C01B 3/344 |
| 2002/0010220 A1 | 1/2002 | Zeng et al. | |
| 2002/0064494 A1 | 5/2002 | Zeng et al. | |
| 2003/0029088 A1* | 2/2003 | Lyon | C01B 3/56 48/77 |
| 2005/0176589 A1 | 8/2005 | Bulow et al. | |
| 2006/0150635 A1 | 7/2006 | Su et al. | |
| 2011/0094226 A1* | 4/2011 | McHugh | F01K 23/064 60/645 |
| 2011/0117004 A1 | 5/2011 | Lamont et al. | |
| 2013/0149650 A1* | 6/2013 | Gauthier | C10J 3/725 431/7 |
| 2013/0303681 A1 | 11/2013 | Tsuchida et al. | |

FOREIGN PATENT DOCUMENTS

| | | |
|---|---|---|
| CN | 101900329 A | 12/2010 |
| DE | 102005034071 A1 | 1/2007 |
| EP | 0913184 B1 | 5/1999 |
| EP | 0995715 A1 | 4/2000 |
| EP | 1547972 A2 | 6/2005 |
| JP | 04164803 A | 6/1992 |
| JP | 05004044 A | 1/1993 |
| JP | 3315719 B2 | 8/2002 |
| WO | 2011062728 A1 | 5/2011 |
| WO | 2012153003 A1 | 11/2012 |

OTHER PUBLICATIONS

Shao, Z. et al., Journal of Membrane Science, 172 (2000), pp. 177-188.
Pecanac, G. et al., Journal of Membrane Science, 385-386 (2011), pp. 263-268.
Schulz, M. et al., Journal of Membrane Science, 378 (2011), pp. 10-17.
Sunarso, J. et al., Journal of Membrane Science, 320 (2008), pp. 13-41.
Hossain, M. M. et al., Chemical Engineering Science 63 (2008), pp. 4433-4451.
Ullmann, H. et al., Keramische Zeitschrift 57 (2005), 2, pp. 72-78.
Kaps, C. et al., Proceedings of the 2nd International Congress on Ceramics, Verona, Italy, Jun. 29-Jul. 4, 2008.

* cited by examiner

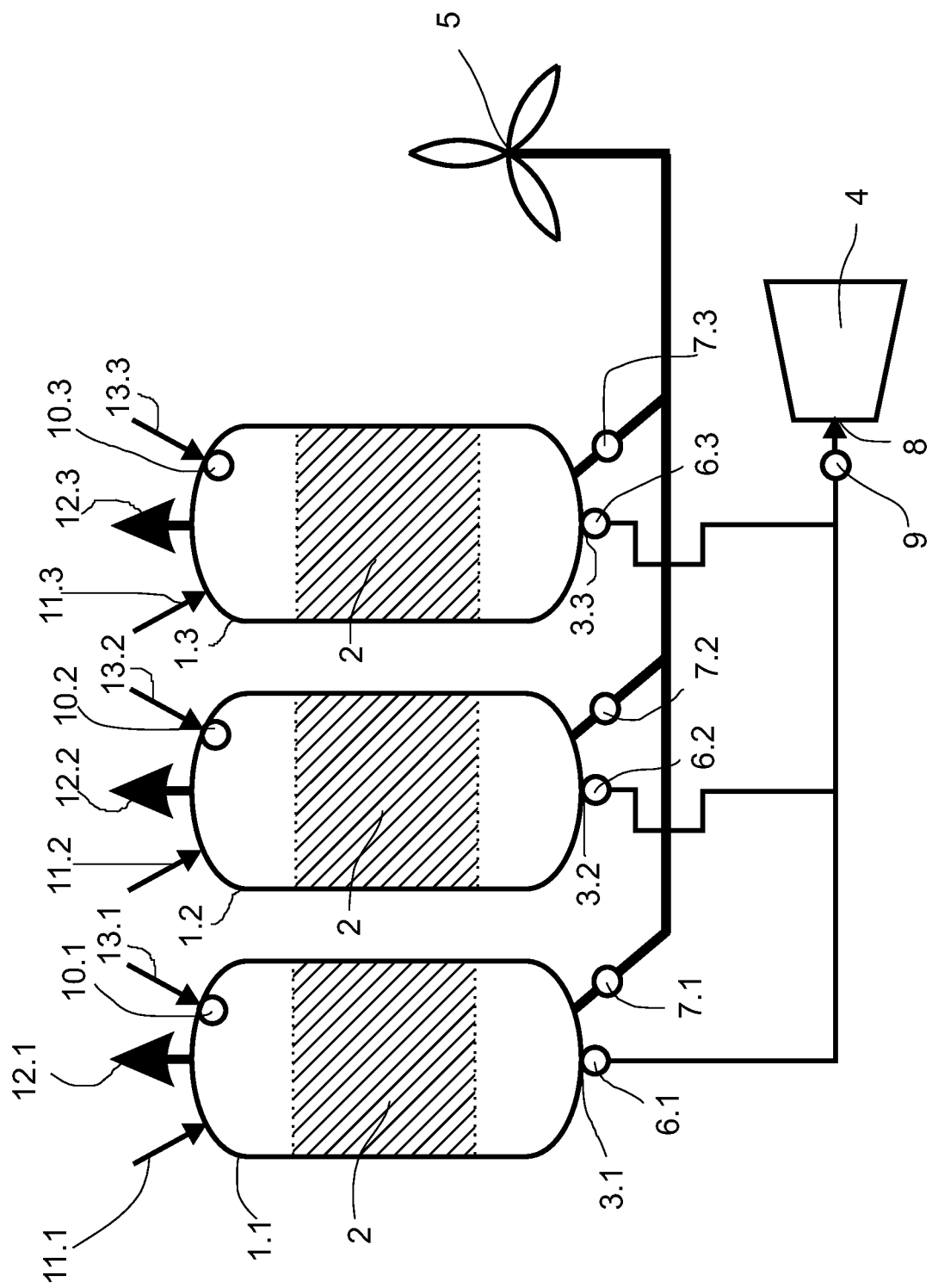

ARRANGEMENT AND PROCESS FOR CARRYING OUT AN INTENSIFIED COMBUSTION

BACKGROUND OF THE INVENTION

Field of the Invention

The invention is directed to a combustion engine and to a process for energy production by means of expansion work in combustion engines.

Discussion of Background Information

The use of self-compacting combustion processes for energy purposes (hereinafter SCC [Self-acting Compacting Combustion] process) was first described by Lampinen in WO 2012/153003 A1. It results from the fact that an automatic compaction of combustion gases takes place when a special ion-conducting membrane provides for the input of oxygen and nitrogen into the combustion space through the hot reactor wall. The driving force for the oxygen ($O_2$) transport results mainly from the low $O_2$ partial pressure in the combustion space. Therefore, the usual compression of combustion air is no longer necessary; the proportion of usable expansion work is greater. Accordingly, the theoretically obtainable efficiency of a combustion engine is significantly increased.

Since high pressures and temperatures are aimed for in high-efficiency combustion engines, a corresponding SCC process is characterized by high requirements with regard to the stability of the utilized membrane components. Ceramic membranes are usually brittle and should have the thinnest walls possible in order to realize high flows. This conflicts with the high mechanical stability required for the SCC process, particularly when high efficiencies and the high combustion pressures and combustion temperatures required for this purpose are aimed for. Accordingly, a SCC process using ceramic membranes should be limited to pressures below 100 bar or less. Further, connecting a combustion engine leads to periodic modifications of the combustion process, particularly to fluctuations in temperature and pressure. The resulting vibrations can jeopardize the mechanical integrity of the membranes.

Established materials for use as OTM (Oxygen Transport Membrane) such as BSCF ($Ba_{0.5}Sr_{0.5}Co_{0.5}Fe_{0.2}O_{3-\delta}$) are known for their high oxygen flux which is based on their mixed conductivity (MIEC or Mixed Ionic-Electronic Conductivity). However, BSCF is also known for the decomposition of the underlying crystalline phase below 830° C. (Shao, Z. et al: Investigation of the permeation behavior and stability of a $Ba_{0.5}Sr_{0.5}Co_{0.8}Fe_{0.2}O_{3-\delta}$ oxygen membrane, *Journal of Membrane Science* 172 (2000), pages 177-188). Moreover, higher temperatures lead to appreciably higher creep rates of the material so that a mechanical failure was predicted already for 900° C. and 20 bar pressure difference (Pecanac, G., et al.: Mechanical properties and lifetime predictions for $Ba_{0.5}Sr_{0.5}Co_{0.8}Fe_{0.2}O_{3-\delta}$ membrane material, *Journal of Membrane Science* 385-386 (2011), pages 263-268). Moreover, MIEC materials of this type which are based on the perovskite-type structure contain high proportions of alkaline earths which react with $CO_2$ to sharply reduce the oxygen flux with increasing $CO_2$ content (Schulz, M., et al., Assessment of $CO_2$ stability and oxygen flux of oxygen permeable membranes, *Journal of Membrane Science* 378 (2011), pages 10-17).

Further, the adiabatic combustion of fuels typically leads to gas temperatures far exceeding 2000° C. Therefore, although the temperature of the membrane will be lower, high-temperature materials based on $ZrO_2$ and $CeO_2$ should be used. However, the oxygen flux in materials of this kind is appreciably lower than that of the perovskites (Sunarso, J., et al., Mixed ionic-electronic conducting (MIEC) ceramic-based membranes for oxygen separation, *Journal of Membrane Science* 320 (2008), 13-41). While a cooling of the combustion gases or of the membrane walls seems possible in principle, it makes technical implementation more complicated and reduces efficiency.

Realization of very high pressures in the SCC process using ceramic OTM membranes seems possible only when the pressures are identical on both sides of the membrane. In this case, the entire membrane material would be under compressive strain and there would be no areas under tensile strain so that a longer life of the membrane can be expected. However, a load situation of this type is not useful for the SCC process because a corresponding compression of the air would use up the additionally usable expansion work. On the whole, it may be stated that no membrane materials with sufficiently high oxygen permeation and stability are available for the aimed—for high temperatures and pressures of the SCC process.

Materials for OTM are also often capable of reversible storage of oxygen, i.e., capable of functioning as oxygen storage materials (hereinafter OSM). The oxygen is built into the crystal lattice of the solid material. Different OSMs and different methods have been claimed or described heretofore as processes, e.g., so-called chemical looping combustion (CLC: U.S. Pat. No. 5,447,024 A; Hossain, M. M., de Lasa, H. I., Chemical-looping combustion (CLC) for inherent $CO_2$ separations—a review, *Chemical Engineering Science* 63 (2008), 4433-4451) and ceramic autothermal recovery (CAR)(EP 0 913 184 B1; Ullmann, H., et al., Oxidkeramiken mit hohem Sauerstofftransport [Oxide Ceramics with high oxygen transport], *Keramische Zeitschrift* 57 (2005) 2, 72-78). Further, different material compositions based on perovskites and fluorites have been claimed as OSMs (JP 05004044 A, EP 1 547 972 A3, U.S. Pat. No. 6,059,858 A, DE 10 2005 034 071 A1), frequently combined with determined procedures such as gas purification (JP 05004044 A, JP 04164803 A) or together with a determined implementation of the method using special gases (U.S. Pat. No. 6,464,955 B2, EP 0 995 715 A1).

Owing to the corresponding chemical reactions of the OSMs with oxygen, charging corresponds to an oxidation of the OSM and discharging corresponds to a reduction of the OSM. The former process is always exothermal, the latter is always endothermal. Therefore, a cyclical charging and discharging of OSMs is always accompanied by the release of heat and consumption of heat (Kaps, C., Kriegel, R., Perovskite ceramics as smart materials for efficient energy technologies, *Proceedings of the 2nd International Congress on Ceramics*, Verona, Italy, Jun. 29-Jul. 4, 2008).

The enthalpy for reduction or oxidation of OSMs depends substantially on their chemical composition, particularly on the type of metal that dominates the charging and discharging behavior by its change in valency. A slight change in valency typically accompanies a low oxidation enthalpy of approximately −50 kJ/mol of $O_2$, e.g., in iron-based or cobalt-based mixed conductivity perovskite-type oxides. Mn-based and Cr-based OSMs, on the other hand, exhibit oxidation enthalpies of up to approximately −350 kJ/mol of $O_2$. For this reason, the CAR method (U.S. Pat. No. 6,059,858 A), for example, which is oriented to an energy-efficient oxygen generation uses primarily Co-based and Fe-based mixed oxides in order to generate the largest possible amounts of $O_2$ with the fewest possible changes in the $O_2$ partial pressure. Accordingly, the temperature change in the corresponding Co-containing and Fe-containing OSMs remains low.

A cyclical combustion process using OSMs generates large amounts of heat which are also partially carried into the OSM. Therefore, it seems difficult to keep the temperature of a reactor filled with OSM low, particularly when the cycle time is very short. This can be expected particularly for gases under pressure in combustion engines.

It is the object of the invention to show a possibility for supplying oxygen to the combustion space of a self-compacting combustion engine in an energy-efficient manner.

SUMMARY OF THE INVENTION

According to the invention, with an arrangement for carrying out an intensified combustion for automatically increasing pressure of the combustion gases and using them in a combustion engine for performing mechanical work, the above-stated object is met in that an oxygen storage material is provided in the combustion space so that a self-compacting combustion process is made possible by storing the oxygen in the oxygen storage material in the combustion space.

An advantageous configuration of a combustion engine with a work chamber results in that the work chamber comprises at least two reaction chambers, wherein each reaction chamber contains an oxygen storage material and has at least inputs for a fuel and fresh air, a first output for giving off the oxygen-depleted air and a second output which is provided with a valve for giving off combustion gases. Further, all of the second outputs communicate via an input with a downstream work chamber, wherein only one valve is opened in each instance for introducing the combustion gases into the work chamber. By "work chamber" is meant any space in which the combustion gases which are under high pressure and at high temperatures can perform mechanical work, i.e., particularly of combustion engines or turbines.

In a method for carrying out an intensified combustion for automatically increasing pressure of the combustion gases and the use thereof in a combustion engine for performing mechanical work, the above-stated object is further met in that an oxygen storage material is stored in the combustion space, fresh air is supplied, wherein the oxygen storage material extracts the oxygen from the fresh air, fuel is subsequently supplied, which fuel is completely combusted with the oxygen exiting from the oxygen storage material, finally, the combustion gases which are under high pressure and at high temperature are used to perform mechanical work.

An advantageous configuration of the process according to the invention for production of energy by means of expansion work with combustion engines with at least two reaction chambers is characterized by the following process steps:

a) a first reaction chamber is aerated with fresh air so that the oxygen storage material located in the reaction chamber extracts the oxygen from the fresh air;

b) after saturation of the oxygen storage material with oxygen, the supply of fresh air is interrupted and a fuel is metered into the reaction chamber and ignites and is completely combusted by the oxygen exiting from the oxygen storage material;

c) the combustion gases which are under high pressure are supplied to a flow machine;

d) steps a) to c) are carried out consecutively for further reaction chambers, the quantity of the further reaction chambers being determined at least in that the first reaction chamber has interrupted its fresh air supply through saturation with oxygen.

The present invention overcomes the above-described disadvantages of the prior art in that oxygen storage materials with a reduction enthalpy above 150 kJ/mol of $O_2$ are used, the recharging is extended in time after the combustion process, and a surplus of air is used for cooling, and water is added in liquid or gaseous form for internal cooling.

The combustion heat for hydrocarbons amounts to approximately −650 kJ/mol for its chief constituent, the $CH_2$ group. One and one half moles of oxygen are needed for the combustion of a $CH_2$ group in water and $CO_2$. Accordingly, a normalization of the combustion enthalpy of hydrocarbons to the converted amount of oxygen gives a value of approximately −430 kJ/mol of converted oxygen. Therefore, it appears possible to compensate a majority of the reaction heat being released in the combustion process through the reduction of the oxygen storage material when the oxidation enthalpy thereof is comparable. In addition, liquid water or vapor can be used to keep the temperature of the oxygen storage material low during the combustion.

The present invention claims a technical solution variant of the SCC process using an oxygen storage material which is used as porous body or as packed bed in at least two coupled reaction chambers. The combustion of the fuel is carried out in at least one reaction chamber which contains an oxygen storage material charged with oxygen. The oxygen storage material releases the oxygen without a substantial change in volume during the combustion process. The released oxygen reacts with the fuel and accordingly heats the oxygen storage material and the reaction chamber. Accordingly, the gas pressure and temperature in the reaction chamber increase until the fuel is completely oxidized or the storage capacity of the oxygen storage material is depleted. Subsequently, a different oxygen storage material is used for the combustion of the fuel. The discharged oxygen storage material is regenerated with a surplus of fresh air.

BRIEF DESCRIPTION OF THE DRAWING

The invention will be described more fully in the following with reference to embodiment examples. The drawing shows:

FIG. 1 a schematic view of an SCC process.

DETAILED DESCRIPTION OF EMBODIMENTS OF THE INVENTION

According to FIG. 1, the substantial component parts of a combustion engine are three reaction chambers 1.1, 1.2 and 1.3 comprising in each instance stored oxygen storage material 2 and a work chamber 4 for performing the mechanical work. The work chamber 4 can be associated with a gas turbine which in turn drives a generator (not shown in FIG. 1) for generating electrical energy. A fan 5 is connected via pipes to each individual reaction chamber 1.1, 1.2 and 1.3 for supplying fresh air. Every reaction chamber 1.1, 1.2 and 1.3 has a first output 12.1, 12.2, 12.3 for discharging the oxygen-depleted air, a second output 3.1, 3.2, 3.3 for discharging the combustion gases and two further inputs. The one input 11.1, 11.2, 11.3 lets in the fuel and the other input 13.1, 13.2, 13.3 lets in water or water vapor.

EMBODIMENT EXAMPLE 1

Referring to FIG. 1, three reaction chambers 1.1, 1.2 and 1.3 are used for the self-compacting combustion of natural gas. Each reaction chamber 1.1, 1.2 and 1.3 has an inner volume of 1.8 liters which has been filled with 1 kg of oxygen storage material 2. A granulate of CSFMM5555 ($Ca_{0.5}Sr_{0.5}Mn_{0.5}Fe_{0.5}O_{3-\delta}$) with an open porosity of 30 percent by volume and a density of 3.67 g/cm$^3$ is used for the oxygen storage material packed bed. The feedstock is produced via conventional ceramic mixed oxide technology and is subsequently mixed with potato starch as pore-former. The mass is molded through extrusion or continuous casting to strands with a diameter of about 4 mm and lengths of 10 to 15 mm. The sintering is carried out for 3 hours at 1430° C. The oxidation enthalpy of the oxygen storage material fabricated in this way is about −280 kJ/moles $O_2$.

The three reaction chambers 1.1, 1.2 and 1.3 are connected in each instance via their second outputs 3.1, 3.2 and 3.3 to a work chamber 4 through pipes which are as short as possible and which have a small inner diameter. The pipes between fan 5 and reaction chambers 1.1, 1.2 and 1.3 have appreciably larger diameters in order to minimize pressure losses and enable large air throughputs at ambient pressure. All of the connection points between the pipes are outfitted with valves 6.1, 6.2, 6.3, 7.1, 7.2, 7.3 which can be formed as electromagnetic valves or check valves. A pressure reducing valve 9 is arranged at one input 8 of the work chamber 4. The outer surfaces of the reaction chambers 1.1, 1.2 and 1.3 are water-cooled and are connected to a cooling circuit. Additionally, all of the reaction chambers 1.1, 1.2 and 1.3 are outfitted with atomizer nozzles 10.1, 10.2, 10.3 for injection of liquid water or vapor.

The SCC process is started by heating up the reaction chambers 1.1, 1.2 and 1.3 with a natural gas burner, not shown. During the heating, at least an oxygen content of 5 percent by volume is realized in the exhaust gas in order to prevent a discharging of the oxygen storage material packing during heating. After a temperature of 650° C. is reached in the first reaction chamber 1.1, 4.8 standard liters of natural gas are injected into the latter via its input 11.1 at a pre-pressure of 15 bar. The combustion of the fuel consumes oxygen that is supplied by the oxygen storage material 2. In this way, the oxygen content z in the oxygen storage material packing is lowered from 2.84 to 2.70 (z in $ABO_z$). The very rapidly progressing combustion generates a gas temperature of more than 3500° C. and a pressure of more than 110 bar. About 15 g of water are sprayed into the combustion zone in addition via another input 13.1 so that the combustion temperature decreases by about 800 K and the pressure increases to 210 bar. The combustion gases under high pressure and the vapor are conducted into the work chamber 4 which is a component part of a flow machine, which flow machine in turn drives a generator for generating electric current. The flow machine is constructed without a compression part and without a feed of combustion air, or these components are not utilized. When the pressure falls below 15 bar, natural gas is metered into the second reaction chamber 1.2 via its input 11.2 and combusted in the manner described above. The temperature of the oxygen storage material packings is permanently monitored and controlled in that varying amounts of water are metered in via the inputs 10.1, 10.2, 10.3. A maximum temperature of the oxygen storage material packing of 1200° C. is aimed for.

After every combustion process, the discharged oxygen storage material packing is regenerated with fresh air. Typically, the air throughput is two to four times the amount that would be required in theory for reoxidizing the oxygen storage material in its entirety. The surplus of cold air is used to keep the packing temperature at a constant level.

EMBODIMENT EXAMPLE 2

For a self-compacting combustion of benzene, three reaction chambers 1.1, 1.2 and 1.3 are used which have an inner volume of 0.6 liters in each instance. The reaction chambers 1.1, 1.2 and 1.3 are filled in each instance with 1 kg $CaMnO_3$ in the form of a packing of mini-honeycombs which have a free volume of 65 percent by volume and a bulk density of 2.5 g/cm$^3$. The feedstock is produced through conventional ceramic mixed oxide technology and molded through rigid plastic extrusion of an aqueously plasticized mass to form mini-honeycombs with dimensions of 8×8 mm, the strands being cut automatically into short pieces approximately 8 mm in length. The sintering is carried out at 1450° C. for 3 hours. The oxygen storage material mini-honeycombs are then coated with a water-based suspension of 20 mol % $Gd_2O_3$ and 75 mol % NiO to minimize carbonization of the surface. The coating is baked in for 2 hours at 1000° C. The oxidation enthalpy of the material fabricated in this way is about −300 kJ/mol of $O_2$.

The three reaction chambers 1.1, 1.2 and 1.3 are connected to one another and to a work chamber 4 through pipes which are as short as possible and which have small inner diameters. The pipes between fan 5 and reaction chambers 1.1, 1.2 and 1.3 have appreciably larger diameters in order to minimize pressure losses and enable large air throughputs. All of the connection points between the pipes are outfitted with valves 6.1, 6.2, 6.3, 7.1, 7.2, 7.3. A pressure reducing valve 9 is arranged upstream of the work chamber 4. The outer surfaces of the reaction chambers 1.1, 1.2 and 1.3 are water-cooled and are connected to a cooling circuit. Additionally, all of the reaction chambers 1.1, 1.2 and 1.3 are outfitted with atomizer nozzles at inputs 10.1, 10.2, 10.3 for injection of liquid water or vapor.

The reaction chambers 1.1, 1.2 and 1.3 are first preheated to 600° C. through combustion of benzene under surplus air. Subsequently, the air supply is closed and 9 g of benzene are sprayed into the first reaction chamber 1.1. The atomized fuel ignites and is completely oxidized through the oxygen exiting from the oxygen storage material packing. The oxygen content z of the oxygen storage material mini-honeycombs is accordingly lowered from 2.95 to 2.65 (z in $ABO_z$). The combustion gases increase in temperature to more than 4,000 K, the pressure increases to more than 800 bar. The gas temperature can be lowered by approximately 900 K by spraying in approximately 30 g of liquid water, and the pressure increases to 1600 bar.

As was already described in Embodiment Example 1, the gas under high pressure is used for generating current in a flow machine.

After every combustion process, the discharged oxygen storage material mini-honeycombs are regenerated with fresh air. The air throughput is typically two to four times the throughput required for the complete reoxidation of the oxygen storage material packing in its entirety. The surplus of cold fresh air is used to cool the oxygen storage material packing and the reaction chambers and to keep the temperature at a constant level.

There is a quantity of three reaction chambers 1.1, 1.2, 1.3 in Embodiment Examples 1 and 2. In principle, the quantity is determined by the temporal ratio between combustion phase and reoxidation phase. Since the combustion phase is considerably shorter than the reoxidation phase, a corresponding quantity of reaction chambers is selected to realize a substantially continuous gas flow at input 8 of work chamber 4.

LIST OF REFERENCE NUMERALS

1.1 reaction chamber
1.2 reaction chamber
1.3 reaction chamber
2 oxygen storage material
3.1 second output
3.2 second output
3.3 second output
4 work chamber
5 fan
6.1 valve
6.2 valve
6.3 valve
7.1 valve
7.2 valve
7.3 valve
8 input (of the work chamber 4)
9 pressure reducing valve
10.1 atomizer nozzles
10.2 atomizer nozzles
10.3 atomizer nozzles
11.1 input (for fuel)
11.2 input (for fuel)
11.3 input (for fuel)
12.1 first output
12.2 first output
12.3 first output
13.1 input (for water or water vapor)
13.2 input (for water or water vapor)
13.3 input (for water or water vapor)

What is claimed is:

1. A process for carrying out a combustion, wherein combustion gases are automatically compressed and the compressed combustion gases are used in a combustion engine for performing mechanical work, and wherein the process comprises:
   storing an oxygen storage material in a combustion space;
   supplying fresh air, with the oxygen storage material extracting oxygen from the fresh air;
   subsequently supplying fuel, completely combusting the fuel with oxygen released by the oxygen storage material to form hot compressed combustion gases;
   injecting liquid water or gaseous water into the combustion space for cooling the oxygen storage material, for cooling an interior of the combustion space, and for increasing a pressure of the hot compressed combustion gases; and
   using the hot compressed combustion gases for performing mechanical work.

2. The process of claim 1, wherein the process is carried out using at least two reaction chambers comprising the combustion space, and wherein:
   (a) a first reaction chamber is supplied with fresh air so that the oxygen storage material present in the first reaction chamber extracts the oxygen from the fresh air;
   (b) after saturation of the oxygen storage material with oxygen, supply of fresh air is interrupted and the fuel is metered into the first reaction chamber and is completely combusted by oxygen released by the oxygen storage material;
   (c) the hot compressed combustion gases are supplied to a work chamber;
   (d) (a) to (c) are carried out consecutively for one or more of the at least two reaction chambers.

3. The process of claim 1, wherein the process is carried out using at least two reaction chambers comprising the combustion space and wherein an air throughput in each reaction chamber is two to four times an air throughput that would be required in theory for reoxidizing the entire oxygen storage material.

4. The process of claim 2, wherein an air throughput in each reaction chamber is two to four times an air throughput that would be required in theory for reoxidizing the entire oxygen storage material.

5. The process of claim 1, wherein the oxygen storage material is a solid oxygen storage material.

6. The process of claim 5, wherein the oxygen storage material is a porous body.

7. The process of claim 5, wherein the oxygen storage material is a packed bed.

8. An arrangement for carrying out a combustion, wherein combustion gases are automatically compressed and the compressed combustion gases are capable of being used in a combustion engine for performing mechanical work, wherein the arrangement comprises:
   one or more reaction chambers;
   an oxygen storage material provided in each of the one or more reaction chambers, the oxygen storage material configured to transport oxygen into a combustion space within the one or more reaction chambers for automatically compressing combustion gases in the combustion space;
   each reaction chamber comprising:
      at least one input for a fuel;
      at least one input for fresh air; and
      an input for injecting liquid water or gaseous water for cooling the oxygen storage material, for cooling an interior of the reaction chamber, and for increasing a pressure of the compressed combustion gases.

9. The arrangement of claim 8, wherein the one or more reaction chambers comprises at least two reaction chambers, each reaction chamber comprising a first output for giving off oxygen-depleted air and a second output which is provided with a valve for giving off the compressed combustion gases, the second output being in fluid communication with a downstream work chamber via an input of the downstream work chamber, wherein the respective valve of each reaction chamber is configured to be selectively opened for introducing the compressed combustion gases into the downstream work chamber.

10. The arrangement of claim 8, wherein the oxygen storage material has a reduction enthalpy for oxygen removal of 150 kJ/mol of $O_2$ to 350 kJ/mol of $O_2$.

11. The arrangement of claim 9, wherein the oxygen storage material has a reduction enthalpy for oxygen removal of 150 kJ/mol of $O_2$ to 350 kJ/mol of $O_2$.

12. The arrangement of claim 8, wherein the oxygen storage material comprises a granulate of $Ca_{0.5}Sr_{0.5}Mn_{0.5}Fe_{0.5}O_{3-\delta}$ with an open porosity of 30 percent by volume and a density of 3.67 g/cm³.

13. The arrangement of claim 9, wherein the oxygen storage material comprises a granulate of $Ca_{0.5}Sr_{0.5}Mn_{0.5}Fe_{0.5}O_{3-\delta}$ with an open porosity of 30 percent by volume and a density of 3.67 g/cm³.

14. The arrangement of claim 8, wherein the oxygen storage material is combined with a catalyst for increasing a reaction rate.

15. The arrangement of claim 9, wherein the oxygen storage material is combined with a catalyst for increasing a reaction rate.

16. The arrangement of claim 8, wherein the oxygen storage material is a solid oxygen storage material.

17. The arrangement of claim 16, wherein the oxygen storage material is a porous body.

18. The arrangement of claim 16, wherein the oxygen storage material is a packed bed.

19. The arrangement of claim 9, wherein the oxygen storage material is a solid oxygen storage material.

20. The arrangement of claim 19, wherein the oxygen storage material is a porous body or a packed bed.

\* \* \* \* \*